Aug. 30, 1960 D. E. COTTRILL ET AL 2,950,888
DEVICE FOR DETACHABLY HOLDING FISH STRINGERS
Filed June 15, 1959

Inventors
Delbert E. Cottrill
& Robert W. Klier
by M. Talbert Dick
Attorney

United States Patent Office 2,950,888
Patented Aug. 30, 1960

2,950,888

DEVICE FOR DETACHABLY HOLDING FISH STRINGERS

Delbert E. Cottrill, 1810 10th St., and Robert W. Klier, 802 Pleasant View Drive, both of Des Moines, Iowa Filed June 15, 1959, Ser. No. 820,446

5 Claims. (Cl. 248—41)

This invention relates to fishing equipment and more particularly to a device used either on the person of the fisherman or on the boat for detachably holding a fish stringer.

Fish stringers usually consist of an elongated flexible cord, rope, cable or like, having a loop at one end and a needle at the other end. The needle is passed through the gill and mouth of the caught fish and then through the loop, thereby securing the fish to the stringer. The needle end of the stringer is then tied to the boat or the belt of the fisherman. Obviously, the long needle is of considerable danger to the user. Also, the tying and untying of the stringer is an objectionable task inasmuch as it is usually wet. Cold weather further complicates the task and renders the removal and replacement of the stringer a disagreeable process.

Therefore, one of the principal objects of our invention is to provide a fish stringer holder that will easily and quickly secure or release the fish stringer.

A further object of this invention is to provide a fish stringer holder that shields the needle against accidentally injuring the user.

A still further object of this invention is to provide a fish stringer holding means that may be secured to either the user or the boat used by the fisherman.

Still further objects of our invention are to provide a fish stringer holder that is economical in manufacture, durable in use, and refined in appearance.

These and other objects will be apparent to those skilled in the art.

Our invention consists in the construction, arrangements, and combination, of the various parts of the device, whereby the objects contemplated are attained as hereinafter more fully set forth, specifically pointed out in our claims, and illustrated in the accompanying drawings, in which:

Figure 1:
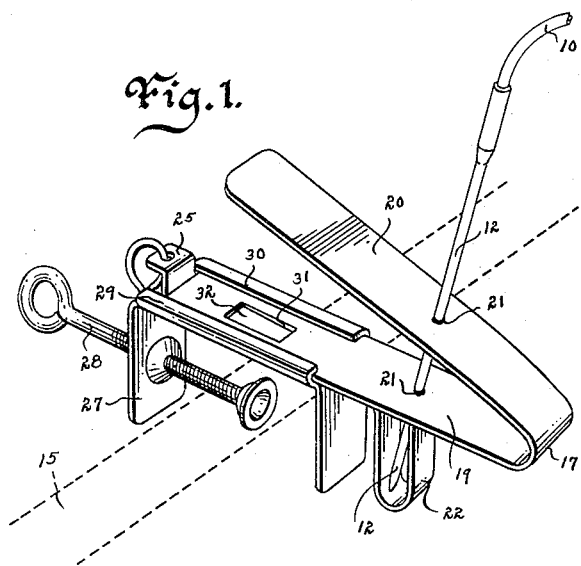
Fig. 1 is a perspective view of our entire device secured to a boat.
Figure 2:
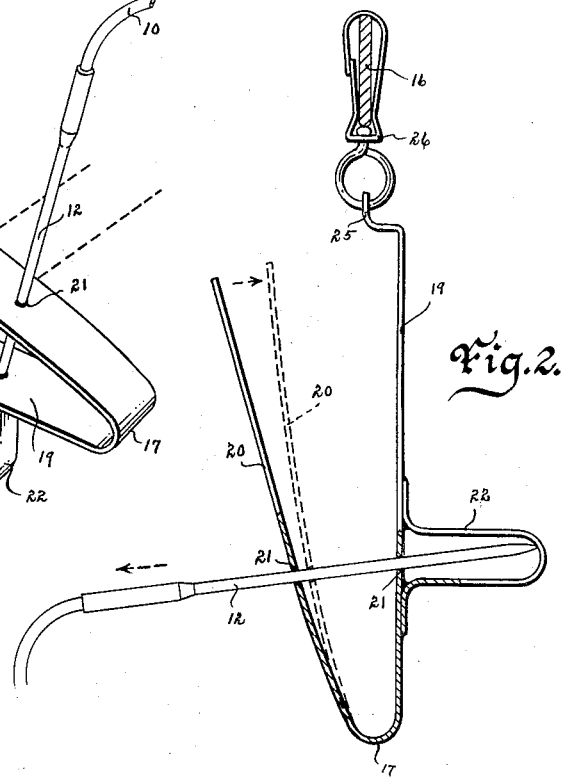
Fig. 2 is a side view of a portion of the unit when used on the belt of a fisherman.
Figure 3:
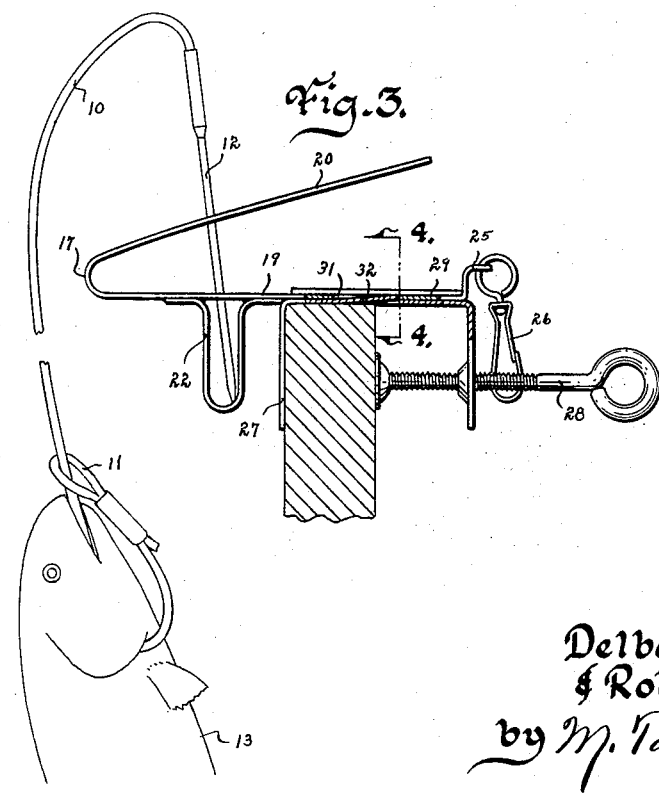
Fig. 3 is a reduced side sectional view of the device in use on a boat.
Figure 4:
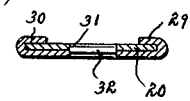
Fig. 4 is a cross sectional view of our unit taken on line 4—4 of Fig. 3 and more fully illustrates its construction.

In the drawings we have used the numeral 10 to designate the elongated flexible strand of a fish stringer having the loop portion 11 at one end and the elongated metallic needle 12 at its other end. The numeral 13 designates a fish strung on the fish stringer and the numeral 15 the side wall of an open boat. The numeral 16 designates the belt of a fisherman. The numeral 17 designates a V-shaped leaf spring strap having the two arm portions 19 and 20. Each of these arm portions has a needle receiving hole 21. These holes extend transversely through their respective arms and at a right angle to the surface of their respective arms. By manually compressing these two arms 19 and 20 toward each other and against the resiliency of the V-shaped strap, the two holes 21 will come into axial alignment with each other and axially parallel with each other. The diameter of the stringer needle is substantially that of the diameter of the holes 21. The numeral 22 designates a loop strap guard secured on the outer side of one of the arms and which loosely embraces its hole as shown in Fig. 2.

To use the device, the two arms 19 and 20 are compressed toward each other to bring the two holes 21 into alignment, at which time the needle of the stringer may be inserted easily through the two holes with the end of the needle extending into the protective strap guard. This guard not only embraces the sharp end of the needle but acts as a stop for limiting the distance the needle is extended through the holes. By merely releasing the pressure on the two arms, they will yieldingly spread apart, thereby moving the holes out of alignment and binding them onto the shaft of the needle in locked condition. The needle cannot be withdrawn from the device until the arms are again compressed toward each other. Thus the fish string can easily and quickly be secured to our holder and as easily and quickly removed therefrom. No tying of the fish stringer is ever necessary. The shielded needle point reduces the hazard of injury. The numeral 25 designates a tab on the free end of the arm having the guard. Secured to this tab is an ordinary snap fastener 26 that may be detachably secured to the belt of the fisherman as shown in Fig. 2.

The numeral 27 designates a C-clamp having the usual threaded fastening screw shaft 28 threaded through one end portion. This C-clamp is used when it is desired to detachably secure the fish stringer holder to a boat. The C-clamp is inverted and placed to embrace the wall 15 or other member of a boat. On the central area of the clamp are two spaced apart flanges 29 and 30. These two flanges extend first outwardly from the C-clamp and then inwardly toward each other to provide a groove-way for slidably receiving the arm 19 of the V-strap spring member 17. In the arm 19 we provide a rectangular hole 31. The numeral 32 designates a spring finger or like on the C-clamp capable of extending into the hole 31 and preventing the accidental removal of the fish stringer holder. To remove the fish stringer holder, from the C-clamp, it is merely necessary to manually depress the finger 32 from the hole opening 31, and slide the arm 19 from the groove-way of the C-clamp.

Some changes may be made in the construction and arrangements of our device for detachably holding fish stringers without departing from the real spirit and purpose of our invention, and it is our intention to cover by our claims, any modified forms of structure or use of mechanical equivalents which may be reasonably included within their scope.

We claim:

1. In a holding device for detachably holding a needle, a V-shaped resilient strap portion having a needle receiving hole in each of its two arm portions, each of the two holes in said V-shaped resilient portions extending at a right angle through its respective arm portion and adapted to detachably embrace a needle, and a loop guard member secured on the outer side of one of the arms of said V-shaped member loosely embracing the hole in the arm to which it is secured, and adapted to encompass the sharp end of a needle.

2. In combination, a V-shaped spring strap having two arm portions each of which has a needle receiving hole extending transversely therethrough; said two holes capable of being placed into substantially parallel axial relationship by the compression of said two arm portions toward each other, and a loop guard member on the outer side of one of said arm portions loosely embracing its hole, and adapted to encompass the sharp end of a needle extending through said two holes.

3. In combination, a V-shaped spring strap having two arm portions each of which has a needle receiving hole extending transversely therethrough; said two holes capable of being placed into substantially parallel axial relationship by the compression of said two arm portions toward each other, a loop guard member on the outer side of one of said arm portions loosely embracing its hole, and adapted to encompass the sharp end of a needle extending through said two holes, a C-clamp member, a shaft member threaded through one end portion of said C-clamp member, and a groove on said C-clamp slidably detachably embracing one of the said arm portions.

4. In combination, a V-shaped spring strap having two arm portions each of which has a needle receiving hole extending transversely therethrough; said two holes capable of being placed into substantially parallel axial relationship by the compression of said two arm portions toward each other, a loop guard member on the outer side of one of said arm portions loosely embracing its hole, and adapted to encompass the sharp end of a needle extending through said two holes, a C-clamp member, a shaft member threaded through one end portion of said C-clamp member, a groove on said C-clamp slidably detachably embracing one of the said arm portions, and a means for locking the said arm in the groove of said clamp member against accidental detachment therefrom.

5. In combination, a V-shaped spring strap having two arm portions each of which has a needle receiving hole extending transversely therethrough; said two holes capable of being placed into substantially parallel axial relationship by the compression of said two arm portions toward each other, a loop guard member on the outer side of one of said arm portions loosely embracing its hole, and adapted to encompass the sharp end of a needle extending through said two holes, a C-clamp member, a shaft member threaded through one end portion of said C-clamp member, a groove on said C-clamp slidably detachably embracing one of the said arm portions, a finger receiving opening in that arm portion that slidably detachably engages the groove of said clamp member, and a spring finger on said clamp member yieldingly extending into the finger receiving opening of said arm.

References Cited in the file of this patent

UNITED STATES PATENTS

| | | |
|---|---|---|
| 849,410 | Mills | Apr. 9, 1907 |
| 2,031,044 | Jensen et al. | Feb. 18, 1936 |
| 2,437,331 | Murray et al. | Mar. 9, 1948 |
| 2,441,450 | Smigleski | May 11, 1948 |
| 2,628,051 | Anderson | Feb. 10, 1953 |
| 2,647,669 | White | Aug. 4, 1953 |